(12) United States Patent
Hundt et al.

(10) Patent No.: US 6,957,421 B2
(45) Date of Patent: Oct. 18, 2005

(54) PROVIDING DEBUGGING CAPABILITY FOR PROGRAM INSTRUMENTED CODE

(75) Inventors: Robert Hundt, Sunnyvale, CA (US); Vinodha Ramasamy, Campbell, CA (US); Umesh Krishnaswamy, Sunnyvale, CA (US); Eric Gouriou, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 09/771,403

(22) Filed: Jan. 26, 2001

(65) Prior Publication Data

US 2002/0104074 A1 Aug. 1, 2002

(51) Int. Cl.[7] .............................................. G06F 9/44
(52) U.S. Cl. ...................................... 717/130; 717/129
(58) Field of Search ................................ 717/124–131, 717/151, 158; 714/35, 38, 41, 48; 712/227, 712/244

(56) References Cited

U.S. PATENT DOCUMENTS

| | | | | |
|---|---|---|---|---|
| 5,335,344 A | * | 8/1994 | Hastings ....................... | 714/35 |
| 5,450,586 A | * | 9/1995 | Kuzara et al. ............... | 717/124 |
| 5,909,577 A | * | 6/1999 | Devanbu .................... | 717/127 |
| 6,085,029 A | * | 7/2000 | Kolawa et al. ............... | 714/38 |
| 6,397,382 B1 | * | 5/2002 | Dawson ...................... | 717/130 |
| 6,470,493 B1 | * | 10/2002 | Smith et al. ................ | 717/130 |
| 2002/0073402 A1 | * | 6/2002 | Sangavarapu et al. ...... | 717/129 |

OTHER PUBLICATIONS

Copperman and Thomas, Poor Man's Watchpoints, Jan. 1995, ACM SIGPLAN Notices, vol. 30, No. 1, pp. 37-44.*
Hollingsworth et al, MDL: A Language and Compiler for Dynamic Program Instrumentation, 1997, IEEE, International Conference on Parallel Architectures and Compilation Techniques, pp. 201-212.*

* cited by examiner

Primary Examiner—Kakali Chaki
Assistant Examiner—Trenton J. Roche
(74) Attorney, Agent, or Firm—Tuan V. Ngo

(57) ABSTRACT

The present invention, in various embodiments, is directed to techniques for providing debugging capability for program code instrumentation. In one embodiment, an instrumentor inserts an instrumentation breakpoint at the beginning of a block of original code. When this breakpoint is reached during execution of the application program that includes the block of original code, the instrumenator, from the block of original code, generates a block of instrumented code. This block of instrumented code may include debugging breakpoints that are carried from the block of original code or are inserted into the block of instrumented code during debugging. After generating the instrumented code, the instrumentor executes the instrumented code until debugging breakpoints are reached that stop the program flow, thereby allowing a programmer to perform debugging functions at these debugging breakpoints.

16 Claims, 2 Drawing Sheets

PROVIDING DEBUGGING CAPABILITY FOR PROGRAM INSTRUMENTED CODE

FIELD OF THE INVENTION

The present invention relates generally to program code debugging and, more specifically, to providing debugging capability for program instrumented code.

BACKGROUND OF THE INVENTION

Code instrumentation is a method for analyzing and evaluating program code performance. During this process, new instructions (or probe code) are added to the program, and, consequently, the original code in the program is changed and/or relocated, resulting in modified or instrumented code. Some examples of probe code include adding values to a register, moving the content of one register to another register, moving the address of some data to some registers, etc. Code instrumentation may be statically or dynamically executed by an instrumentor, which, typically, is also a program.

A debugger is a program assisting a programmer to find "bugs" or errors in other programs. A debugger allows the programmer to stop at breakpoints for performing debugging functions. Usually, the programmer examines and changes the value of the program variables, redirects the program flow, single steps the program, etc. Most operating systems support a debugger interface for the programmer to interact with the debugger.

Currently, an instrumentor and a debugger may not work together effectively. For example, an operating system may not allow an instrumentor and a debugger to concurrently control the debugger interface. A debugger may not be able to handle code that has been manipulated or relocated by dynamic code instrumentation. A traditional debugger may not allow setting breakpoints in a non-text segment in the instrumented code. Disassembling code during code debugging in shared memory may cause memory faults. Using breakpoints for both dynamic instrumentation and debugging may be conflicting.

Based on the foregoing, it is clearly desirable that mechanisms be provided to solve the above deficiencies and associated problems.

SUMMARY OF THE INVENTION

The present invention, in various embodiments, is directed to techniques for providing debugging capability for program code instrumentation. In one embodiment, an instrumentor inserts an instrumentation breakpoint at the beginning of a block of original code. When this breakpoint is reached during execution of the application program that includes the block of original code, the instrumenator, from the block of original code, generates a block of instrumented code. This block of instrumented code may include debugging breakpoints that are carried from the block of original code or are inserted into the block of instrumented code during debugging. After generating the instrumented code, the instrumentor executes the instrumented code until debugging breakpoints are reached that stop the program flow, thereby allowing a programmer to perform debugging functions at these debugging breakpoints.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Figure 1:
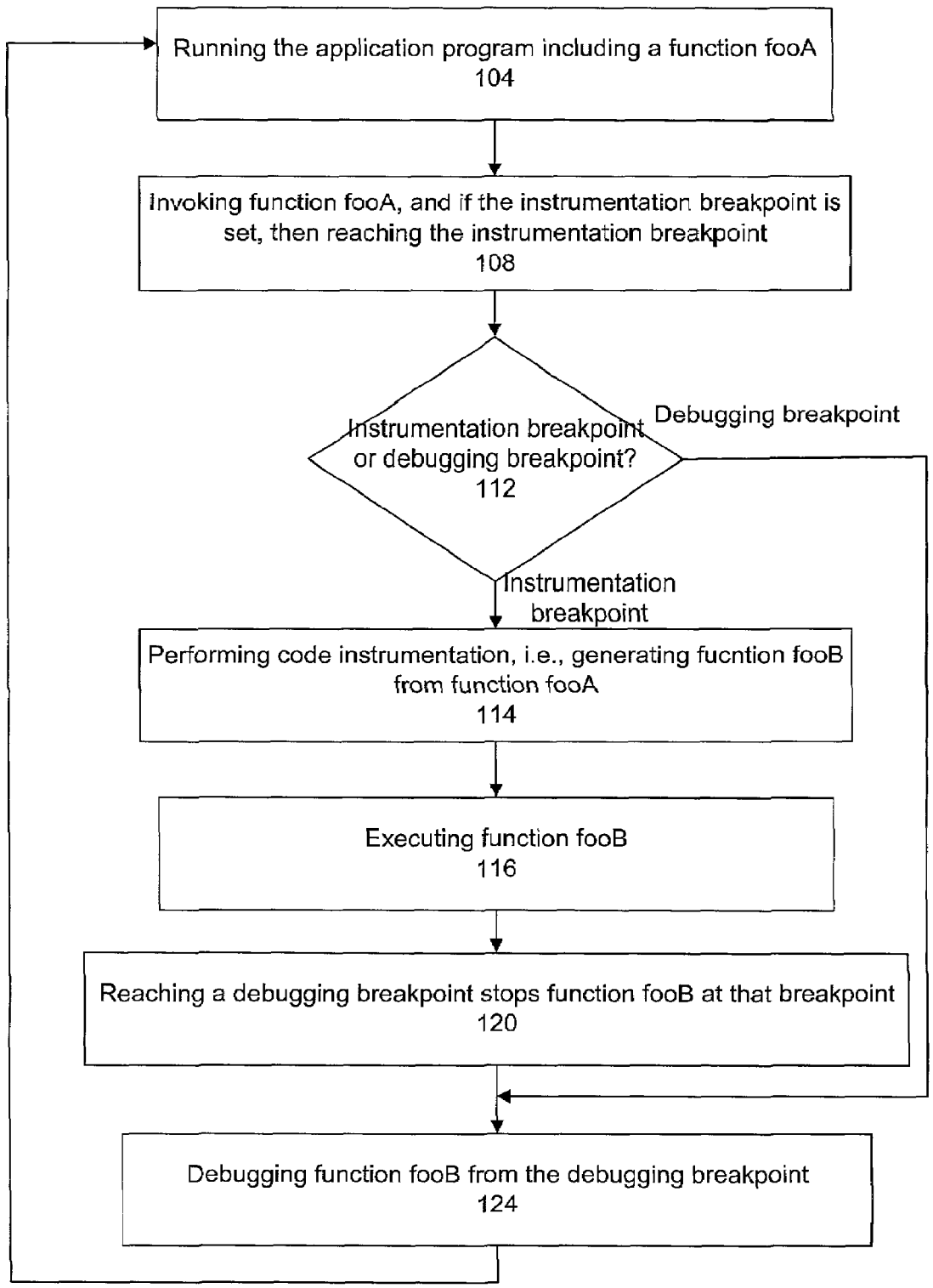
FIG. 1 is a flowchart illustrating the method steps in accordance with one embodiment.

The present invention, in various embodiments, is directed to techniques for providing debugging capability to program instrumented code in code instrumentation. However, the invention is not limited to code instrumentation. Techniques of the invention may be used in other programming areas such as in programs that cannot adapt debugging capability due to conflicts with debugging capability of another program.

In the following description, for the purposes of explanation, numerous specific details are set forth in order to provide a thorough understanding of the invention. However, it will be apparent to one skilled in the art that the invention may be practiced without these specific details. In other instances, well-known structures and devices are shown in block diagram form in order to avoid obscuring the invention.

The Debugging Breakpoints

Debugging breakpoints stop execution of a program at these breakpoints so that a programmer may interactively debug the program. Debugging breakpoints are inserted into a program in various ways including while a programmer is writing or debugging the program. At a debugging breakpoint, the programmer enters commands to debug the program, and, in accordance with the techniques disclosed herein, the programmer is enabled to debug the instrumented code with various debugging functions and tools. For example, a programmer can inspect and change program variable values, single step the program, disassemble the code, redirect the program flow, etc. In one embodiment, the instrumented code may be disassembled, and, because the assembler can identify the length of the instrumented code, decoding the instrumented code across function boundaries is prohibited. This can prevent memory faults.

The Instrumentation Breakpoint

In one embodiment, an instrumentation breakpoint is inserted at the beginning of a block of programming code, which is a sequence of instructions and in which an execution transfer into the block operates only through the first instruction of the sequence. A function in the C or C++ language, a procedure in the Pascal language, or a subroutine in the FORTRAN language is an example of a block of programming code. Alternatively, a function, a procedure, or a subroutine may comprise multiple blocks of programming code. For illustrative purposes, the techniques disclosed herein are described in the context of a function. However, the invention is not limited to functions, but is applicable to blocks of programming code, procedures, subroutines, and their equivalence.

Instrumentation breakpoints enable program transfer between the instrumentor and the program. In one embodiment, an instrumentor substitutes the first instruction of every function for an instrumentation breakpoint. This first instruction is then saved, for example, in memory. Subsequently, after the instrumentation breakpoint is reached, the first instruction is restored and executed with other instructions in the function in a normal way. Where the first instruction comprises a bundle of instructions, this bundle of instructions is saved and restored in the same manner as a single instruction is saved and restored.

The Physical Breakpoint

In one embodiment, there is only one type of "physical" breakpoint being used for both instrumentation and debugging breakpoints. That is, in a program, each of an instrumentation breakpoint and a debugging breakpoint is physically indistinguishable from one another, and the instrumentor provides information to identify whether a breakpoint is an instrumentation breakpoint or a debugging breakpoint. For example, in one embodiment, the instrumentor keeps track and stores information that the instrumentor inserts the instrumentation breakpoint to the block of original code and a programmer provides the debugging breakpoints. Consequently, based on the tracked information, the instrumentor identifies whether a breakpoint is an instrumentation breakpoint or a debugging breakpoint. In one embodiment, a "break" instruction provides physical breakpoints.

Rules for Inserting Breakpoints

Before an instrumentation breakpoint is inserted at an address location, it is determined whether a debugging breakpoint has been inserted at that same address. If a debugging breakpoint has not been inserted, then the instruction at that address is saved, the instrumentation breakpoint is inserted at that address and thus replaces the instruction, and the instruction is later restored for execution as described above. However, if a debugging breakpoint has been inserted, then the instrumentation breakpoint is inserted to replace the debugging breakpoint and information that an instrumentation breakpoint and a debugging breakpoint are intended at the same address is stored for later use. In one embodiment, the instrumentor stores this information. Because a debugging breakpoint has been previously inserted, an instruction or a bundle of instructions at the address of the debugging breakpoint had been saved. Consequently, when appropriate, this instruction (or bundle of instructions) is restored in accordance with the save/restore operations described above.

Similarly, before a debugging breakpoint is inserted at an address location, it is determined whether an instrumentation breakpoint has been inserted at the same location. If an instrumentation breakpoint has not been inserted, then the instruction at that address is saved, the debugging breakpoint is inserted at that address and thus replaces the instruction, and the instruction is later restored as described above. However, if an instrumentation breakpoint has been inserted, then the debugging breakpoint is inserted to replace the instrumentation breakpoint and information that an instrumentation breakpoint and a debugging breakpoint are intended at the same address is stored for later use. In one embodiment, the instrumentor stores this information. Because an instrumentation breakpoint has been previously inserted, an instruction or bundle of instructions at the address of the instrumentation breakpoint had been saved. Consequently, when appropriate, this instruction (or bundle of instructions) is restored in accordance with the save/restore operations described above.

Breakpoint Logic

Breakpoint configuration may be used in various ways for either an instrumentation breakpoint or a debugging breakpoint. For example, breakpoints can be set or reset, and, depending on implementations, when breakpoints are set, a breakpoint prompt may or may not be shown on the programmer's display. In an alternative embodiment, a breakpoint prompt is shown only if a function has been invoked or if the breakpoint is a debugging breakpoint, etc. In one embodiment, information related to breakpoints are stored in the instrumentor to be used as appropriate, for example, to determine whether a block of code has been reached, which is typically used in code coverage analysis.

Method Steps in Accordance with One Embodiment

FIG. 1 is a flowchart illustrating the method steps in accordance with one embodiment. In this FIG. 1 example, a function fooA is instrumented to a function fooB, and function fooA includes an instrumentation breakpoint and various debugging breakpoints having been inserted, for example, by a programmer.

In step 104, an application program including function fooA is running.

In step 108, function fooA is invoked, and, if the instrumentation breakpoint is set, then this breakpoint is reached.

In step 112, it is determined whether the reached breakpoint is an instrumented breakpoint or a debugging breakpoint. Since this is an instrumentation breakpoint, code instrumentation is performed in step 114, i.e., the instrumentor generates function fooB from function fooA. However, if the invoked breakpoint is a debugging breakpoint, then the programmer in step 124 debugs the program from the reached debugging breakpoint.

In step 116, the instrumentor executes function fooB. In one embodiment, a "jump" or "branch" instruction replaces the instrumentation breakpoint at the beginning of function fooA so that program flows from function fooA to function fooB. During execution of function fooB, if a debugging breakpoint is reached, then the program in step 120 stops at this breakpoint, and the programmer in step 124 debugs the program from that breakpoint. After the execution of function fooB including stops at debugging breakpoints is complete, the application program keeps running until another function is invoked and instrumented as in step 108.

Computer System Overview

Figure 2:
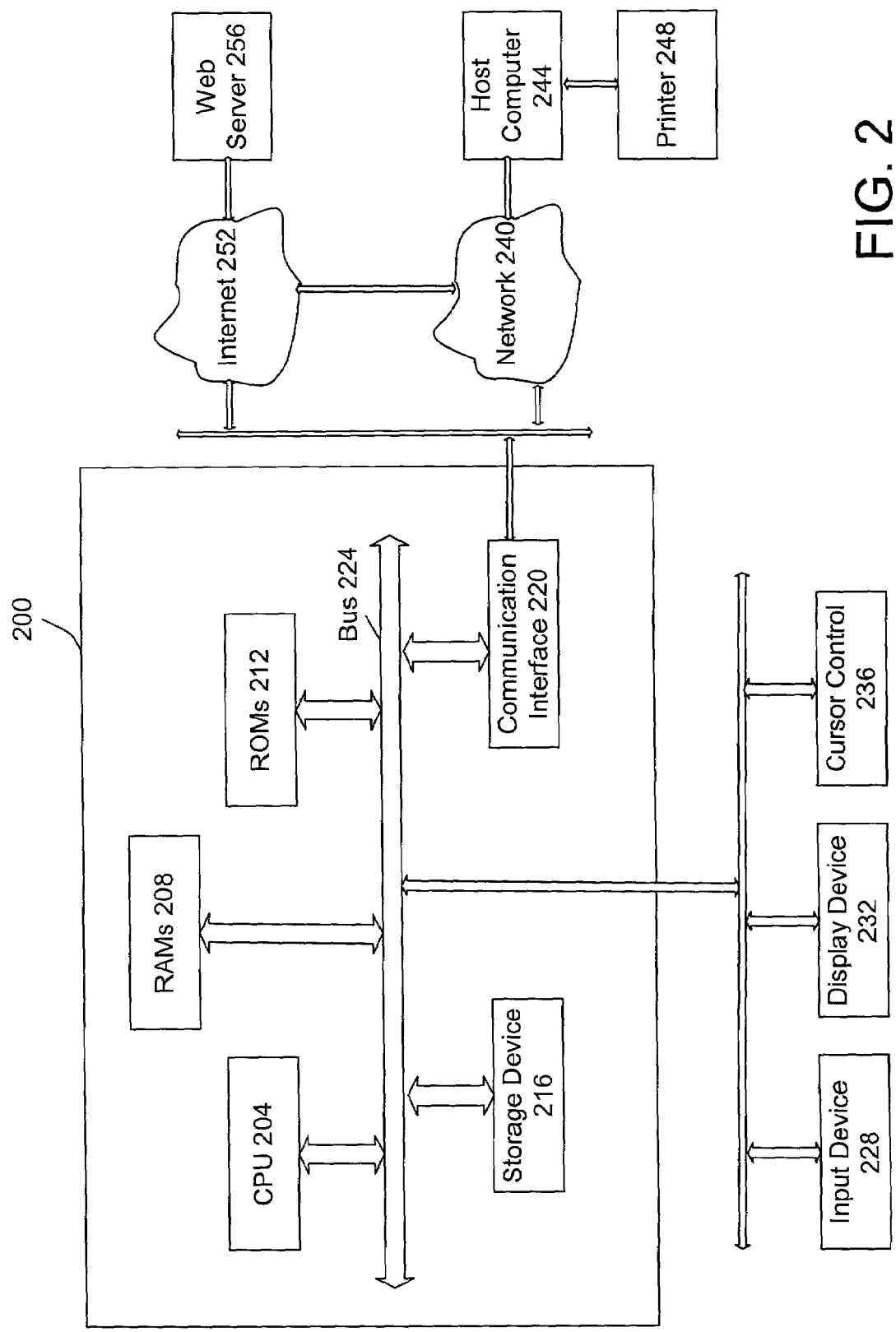
FIG. 2 is a block diagram of computer upon which an embodiment of the invention may be implemented.

FIG. 2 is a block diagram showing a computer system 200 upon which an embodiment of the invention may be implemented. For example, computer system 200 may be implemented to run the instrumentor, the debugger, the application program, etc., as described above. In one embodiment, computer system 200 includes a processor 204, random access memories (RAMs) 208, read-only memories (ROMs) 212, a storage device 216, and a communication interface 220, all of which are connected to a bus 224.

Processor 204 controls logic, processes information, and coordinates activities within computer system 200. In one embodiment, processor 204 executes instructions stored in RAMs 208 and ROMs 212, by, for example, coordinating the movement of data from input device 228 to display device 232.

RAMs 208, usually being referred to as main memory, temporarily store information and instructions to be executed by processor 204. Information in RAMs 208 may be obtained from input device 228 or generated by processor 204 as part of the algorithmic processes required by the instructions that are executed by processor 204.

ROMs 212 store information and instructions that, once written in a ROM chip, are read-only and are not modified or removed. In one embodiment, ROMs 212 store commands for configurations and initial operations of computer system 200.

Storage device 216, such as floppy disks, disk drives, or tape drives, durably stores information for used by computer system 200.

Communication interface 220 enables computer system 200 to interface with other computers or devices. Communication interface 220 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 220 may also allow wireless communications.

Bus 224 can be any communication mechanism for communicating information for use by computer system 200. In the example of FIG. 2, bus 224 is a media for transferring data between processor 204, RAMs 208, ROMs 212, storage device 216, communication interface 220, etc.

Computer system 200 is typically coupled to an input device 228, a display device 232, and a cursor control 236. Input device 228, such as a keyboard including alphanumeric and other keys, communicates information and commands to processor 204. Display device 232, such as a cathode ray tube (CRT), displays information to users of computer system 200. Cursor control 236, such as a mouse, a trackball, or cursor direction keys, communicates direction information and commands to processor 204 and controls cursor movement on display device 232.

Computer system 200 may communicate with other computers or devices through one or more networks. For example, computer system 200, using communication interface 220, communicates through a network 240 to another computer 244 connected to a printer 248, or through the world wide web 252 to a server 256. The world wide web 252 is commonly referred to as the "Internet." Alternatively, computer system 200 may access the Internet 252 via network 240.

Computer system 200 may be used to implement the techniques described above. In various embodiments, processor 204 performs the steps of the techniques by executing instructions brought to RAMs 208. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 204 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 204 are in the form of one or more software programs and are initially stored in a CD-ROM being interfaced with computer system 200 via bus 224. Computer system 200 loads these instructions in RAMs 208, executes some instructions, and sends some instructions via communication interface 220, a modem, and a telephone line to a network, e.g. network 240, the Internet 252, etc. A remote computer, receiving data through a network cable, executes the received instructions and sends the data to computer system 200 to be stored in storage device 216.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for allowing debugging capability in code instrumentation that takes a block of original code to produce a block of instrumented code, comprising the steps of:
providing an instrumentation breakpoint in the block of original code;
running the block of original code including the instrumentation breakpoint until a breakpoint is reached;
determining whether the breakpoint is the instrumentation breakpoint; and, if so, then generating the block of instrumented code;
running the block of instrumented code until a debugging breakpoint is reached, and
performing debugging functions on the block of instrumented code at the reached debugging breakpoint.

2. The method of claim 1 wherein the step of providing comprises the step of replacing a first instruction in the block of original code by the instrumentation breakpoint.

3. The method of claim 2 wherein the first instruction comprises one or more instructions.

4. The method of claim 2 further comprises the step of restoring the first instruction.

5. The method of claim 1 further comprises the step of providing a debugging breakpoint in either the block of original code or the block of instrumented code.

6. A computer-readable medium storing instructions that cause a computer to perform a method for allowing debugging capability in code instrumentation that takes a block of original code to produce a block of instrumented code, the method comprising the steps of:
providing an instrumentation breakpoint in the block of original code;
running the block of original code including the instrumentation breakpoint until a breakpoint is reached;
determining whether the breakpoint is the instrumentation breakpoint; and, if so, then generating the block of instrumented code;
running the block of instrumented code until a debugging breakpoint is reached, and
performing debugging functions on the block of instrumented code at the reached debugging breakpoint.

7. The computer-readable medium of claim 6 wherein the step of providing comprises the step of replacing a first instruction in the block of original code by the instrumentation breakpoint.

8. The computer-readable medium of claim 7 wherein the first instruction comprises one or more instructions.

9. The computer-readable medium of claim 7 wherein the method further comprises the step of restoring the first instruction.

10. The computer-readable medium of claim 6 wherein the method further comprises the step of providing a debugging breakpoint in either the block of original code or the block of instrumented code.

11. The method of claim 2 wherein the debugging breakpoint being referred to as a first debugging breakpoint and the first instruction being a second debugging breakpoint.

12. The method of claim 1 wherein the debugging breakpoint being referred to as a first debugging breakpoint and the instrumentation breakpoint being replaced by a second debugging breakpoint.

13. The method of claim 1 wherein an instrumentor provides the instrumentation breakpoint and information related to the instrumentation breakpoint.

14. The computer-readable medium of claim 7 wherein the debugging breakpoint being referred to as a first debugging breakpoint and the first instruction being a second debugging breakpoint.

15. The computer-readable medium of claim 6 wherein the debugging breakpoint being referred to as a first debugging breakpoint and the instrumentation breakpoint being replaced by a second debugging breakpoint.

16. The computer-readable medium of claim 6 wherein an instrumentor provides the instrumentation breakpoint and information related to the instrumentation breakpoint.

* * * * *